United States Patent [19]

Joosten et al.

[11] Patent Number: 4,492,721
[45] Date of Patent: Jan. 8, 1985

[54] METHOD OF PROVIDING MAGNESIUM FLUORIDE LAYERS

[75] Inventors: Paul H. Joosten; Theo J. A. Popma; Hendrikus J. P. Nabben; Henricus A. M. Van Hal; Jan Haisma, all of Eindhoven, Netherlands

[73] Assignee: U.S. Philips Corporation, New York, N.Y.

[21] Appl. No.: 512,518

[22] Filed: Jul. 11, 1983

[30] Foreign Application Priority Data

May 10, 1983 [NL] Netherlands ............... 8301652

[51] Int. Cl.³ ................................. B05D 3/02
[52] U.S. Cl. ................................. 427/226; 427/165; 427/314; 427/384; 427/389.7; 427/421; 427/443.2
[58] Field of Search ............... 427/162, 165, 240, 241, 427/226, 27, 427, 314, 384, 372.2, 389.7, 421, 443.2; 350/164; 126/90 L

[56] References Cited

U.S. PATENT DOCUMENTS 4,128,303 12/1978 Onoki et al. ............... 350/164
4,129,434 12/1978 Plumat et al. ............... 427/162
4,160,061 6/1979 Okino et al. ............... 350/164 X
4,260,222 4/1981 Kozawa ............... 350/164

Primary Examiner—Sadie L. Childs
Attorney, Agent, or Firm—Norman N. Spain

[57] ABSTRACT

Magnesium fluoride layers are obtained by disproportionation of fluorine-containing organic magnesium compounds, notably magnesium trifluoroacetate, magnesium trifluoroacetylacetonate and magnesium hexafluoroacetylacetonate. A solution of such a compound is provided on the substrate in an organic solvent by spinning or dipping at room temperature after which the layer is heated to 500° C. The solution may also be atomized and sprayed on the substrate which is maintained at a temperature of 600° C. It is possible by means of this method to provide pure magnesium fluoride layers at a comparatively low temperature in air and without using film forming vehicles. The $MgF_2$ layers obtained according to said method are useful as antireflective layers on display screens, on optical elements and as components in a multilayer packet, for example a dichroic mirror.

15 Claims, 3 Drawing Figures

METHOD OF PROVIDING MAGNESIUM FLUORIDE LAYERS

The invention relates to a method of providing a layer of magnesium fluoride on a substrate, in which a solution of a fluorine-containing magnesium compound is contacted with the substrate and is the resultant layer of the solution formed on the substrate treated thermally. The invention also relates to the layers obtained by means of said method.

Alkaline earth fluorides have a low refractive index and are therefore suitable as anti-reflective layers on substrates having a higher refractive index. Magnesium fluoride layers are particularly suitable because they have a low refractive index (n=1.38 at a wavelength $\lambda=550$ nm), because they are very resistant to environmental influences and because hard layers are formed which can withstand polishing or even scratching. Moreover, magnesium fluoride layers show only a small colouring when the thickness of the layer is a quarter of the wavelength of the light in the centre of the visible spectrum ($\lambda=550$ nm).

Magnesium fluoride layers are often provided by vapour deposition in a vacuum. For large substrates this method is cumbersome and involves high costs. Moreover, strongly curved surfaces and, for example, the insides of tubes cannot be coated with a uniform layer by vapour deposition in a vacuum. Important substrates on which antireflective layers according to the invention can be provided are various types of plate glass, for example, Pyrex, various optical glasses, quartz glass and phosphors.

An alternative method of providing metal fluoride layers is described, for example, in U.S. Pat. No. 3,475,192. In this method the substrate is coated with a solution of the metal fluoride in a polar organic solvent, after which the substrate is heated to a temperature between 100° and 1000° C., preferably between 400° and 800° C. In this method it is necessary to add a film forming vehicle to the solution so as to obtain a layer of an optically good quality. Said film forming vehicle must be fired in the thermal treatment for which a temperature between 400° and 800° C. may be necessary. Remainders of the film forming vehicle may haze the metal fluoride layer formed.

It is the object of the present invention to provide a method of providing magnesium fluoride layers at a comparatively low temperature and without the use of film forming vehicles, also having for its object to obtain magnesium fluoride layers which are sufficiently pure to ensure a good optical quality.

According to the invention this object is achieved by contacting a solution of a fluorine-containing organic magnesium compound, which comprises at least six fluorine atoms per magnesium atom, with the substrate and treating the resultant layer of the solution formed on the substrate thermally while forming the magnesium fluoride by disproportionation.

The invention is based on the recognition of the fact that organic magnesium compounds which comprise a sufficiently large quantity of fluorine, form magnesium fluoride during a thermal treatment by disproportionation. The magnesium fluoride is the only solid product of the disproportionation. Magnesium oxide and magnesium carbonate are not formed even if no special precautions are taken to exclude air from the reaction.

In a suitable embodiment of the method the substrate is contacted with a solution of a fluorine-containing organic magnesium compound which comprises at least two $-CF_3$-groups per magnesium atom.

Particularly suitable compounds of this type are magnesium trifluoroacetate, magnesium trifluoroacetylacetonate, and magnesium hexafluoroacetylacetonate.

The attached formula sheet shows the structural formulae of the compounds.

Figure 1:
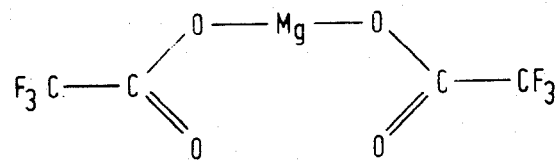
FIG. 1 represents magnesium trifluoroacetate.
Figure 2:
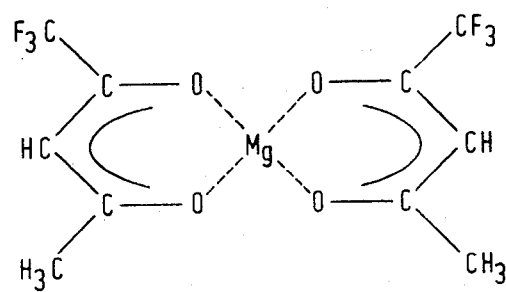
FIG. 2 represents magnesium trifluoroacetylacetonate.
Figure 3:
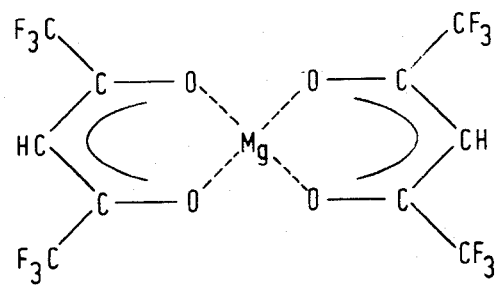
FIG. 3 represents magnesium hexafluoroacetylacetonate.

The magnesium fluoride layers according to the invention can be provided, for example, by coating a substrate, for example of glass or quartz glass, with a layer of a solution of a fluorine-containing organic magnesium compound, as described above. The layer of the solution may be provided, for example, at room temperature by spinning or dipping. The resulting layer is then heated to a temperature of at least 300° C. for at least one minute. When this method is used, magnesium trifluoroacetate is particularly suitable due to its low volatility. This is of particular importance in a thermal treatment above 400° C. In the case of too large a volatility the compound evaporates without forming magnesium fluoride by disproportionation. Suitable solvents in this method are butyl acetate and ethyleneglycol monoethyl ether, but other solvents may also be used.

An alternative embodiment of providing a magnesium fluoride layer consists of spraying a solution of a fluorine-containing organic magnesium compound as described hereinbefore on a substrate which is maintained at a high temperature.

The solution may be atomized, for example ultrasonically with air as a carrier gas, after which the solution is sprayed on the substrate, for example, glass or quartz glass. The temperature of the substrate is maintained preferably above 400° C. because at lower temperatures (experimentally, for example, at 300° and 350° C.) the solution evaporates without forming magnesium fluoride by disproportionation. The temperature of the substrate is moreover chosen preferably below 750° C. because at higher temperatures (experimentally, for example, at 800° C.) the formed magnesium fluoride can turn cloudy and does not adhere well to the substrate. At temperatures above 650° C. optically good layers are obtained only when the deposition time is short. The deposition time of magnesium fluoride layers becomes shorter as the concentration of the fluorine-containing organic magnesium compound in the solution is higher.

When using the spray method for providing magnesium fluoride layers, the rate of evaporation of the solvent and the rate of decomposition of the fluorine-containing organic magnesium compound should be taken into account when choosing the solvent. A solvent is preferably chosen having a boiling-point above 100° C. so as to prevent too fast an evaporation. A boiling-point below 160° C. is desired to prevent too rapid a decomposition of the fluorine-containing organic magnesium compound. An example of a suitable solvent is ethyleneglycol monoethyl ether.

It is known per se that a thermal treatment may be used to convert layers formed by solutions of fluorine-containing organic indium compounds into fluoride-containing indium compounds; see, for example, German Patent Specification No. 934.848. The same is known of fluorine-containing organic tin compounds; see, for example, U.S. Pat. No. 3,759,743. In these cases, however, the metal oxide in question is formed having therein a quantity of metal fluoride. In the most favourable case metal oxyfluoride is formed. The formation of pure metal fluoride with magnesium was therefore not to be expected.

A thermal treatment of layers formed by solutions of fluorine-containing organic iron compounds and yttrium compounds will be described for comparison in the examples 6 and 7 (not according to the invention). The formation of pure metal fluorides takes place only while excluding oxygen, in contrast with the situation with fluorine-containing organic magnesium compounds.

Experiments have demonstrated that in a thermal treatment of layers, formed by calcium trifluoroacetate solutions, calcium fluoride is formed having therein more than 5% by weight of calcium oxide. The layer formed is turbid and does not readily adhere to the surface. This shows the exceptional situation of magnesium compounds, because even the related calcium compounds show a different behaviour under the same circumstances.

The invention will now be described in greater detail with reference to a number of examples.

EXAMPLE 1 (according to the invention)

Magnesium trifluoroacetate is dissolved (10% by weight) in ethyleneglycol monoethyl ether. A glass substrate is dipped in the solution at room temperature or the solution is provided on the glass substrate by spinning, as a result of which an organometallic film is obtained.

The layer thus obtained is heated to 500° C. for one minute resulting in a dense layer which in X-ray spectroscopy has the characteristics of $MgF_2$ and the refractive index n of which is equal to 1.39, as in vapour-deposited $MgF_2$. The layer formed is resistant to polishing. The quantity of reflected light is reduced from 4% (clean glass substrate) to 0.5% (glass substrate having a magnesium fluoride layer).

Magnesium fluoride layers can also be provided, starting from less concentrated solutions (1–10% by weight). The thickness of the layer is larger according as the concentration of the solution is higher.

EXAMPLE 2 (according to the invention)

As example 1, in which magnesium trifluoroacetate is dissolved in butyl acetate (30% by weight). The properties of the formed layer are identical to those of the previous example. Magnesium fluoride layers may also be provided while using less concentrated solutions (1–30% by weight) in butyl acetate.

EXAMPLE 3 (according to the invention)

As example 1, in which the resulting layer is heated to 300° C. The formed layer has a refractive index n=1.40 and further has the same properties as in example 1.

EXAMPLES 4 AND 5 (for comparison)

As example 1, in which magnesium trifluoroacetyl acetonate and magnesium hexafluoroacetyl acetonate are used, respectively. Upon heating to 500° C., said compounds evaporate for the greater part before $MgF_2$ is formed by disproportionation. Therefore, the compounds used should not be too volatile at the chosen temperature.

EXAMPLES 6 AND 7 (for comparison)

As example 1, in which iron(II)trifluoroacetate and yttrium trifluoroacetate are used, respectively. Upon heating to 500° C., iron oxide and yttrium oxyfluoride, respectively, are formed. When on the contrary the thermal treatment is carried out in a nitrogen atmosphere, iron(II) fluoride and yttrium fluoride are formed.

EXAMPLE 8 (according to the invention)

A 1.5% by weight solution of magnesium hexafluoroacetylacetonate in ethyleneglycol monoethyl ether, is atomised ultrasonically and provided on a quartz substrate using air as a carrier gas. The substrate is maintained at a temperature of 650° C. The apparatus used is described in European Patent Specification No. 3148 and in German Patent Specification DE-OS No. 2,802,814.

After spraying for 20 minutes a crystalline layer is formed in a thickness of 0.2 μm and having a refractive index n=1.36. The adhesion and the optical properties of the layer are excellent, as is the scratch resistance. X-ray diffraction measurements indicate that only $MgF_2$ and no MgO is present.

EXAMPLE 9 (according to the invention)

As example 8, in which the substrate is maintained at a temperature of 500° C. After spraying for 60 minutes a layer having a thickness of 0.7 μm is formed having a refractive index n=1.38, further having properties as in the preceding example.

EXAMPLE 10 (according to the invention)

As example 8, in which a 4.3% by weight solution of magnesium hexafluoroacetylacetonate in ethyleneglycolmonoethyl ether is used and in which the substrate is maintained at a temperature of 700° C. The results are the same as in example 6.

EXAMPLES 11 AND 12 (according to the invention)

As example 8, in which solutions of magnesium trifluoroacetate and magnesium trifluoroacetylacetonate are used, respectively. The formed layers have refractive indices between n=1.36 and n=1.40, dependent on the temperature of the substrate. After a thermal treatment at 500° C. the refractive index of the layer formed is slightly higher than after a thermal treatment at 600° C.

The method according to the invention may be used for providing anti-reflective layers on a large number of optical components, for example on lenses and filters, but also on display screens. Said layers may also be provided as components in a transparent infrared mirror in a lamp or illumination tube, or in a stack alternated by layers having a high refractive index (for example ZnS, n=2.36) so as to form a dichroic mirror, for example a laser mirror or an optical filter.

What is claimed is:

1. A method of providing a layer of magnesium fluoride on a substrate in which a solution of a fluorine-containing magnesium compound is contacted with the substrate and the resultant layer of the solution formed on the substrate is treated thermally, characterized in that a solution of a fluorine-containing organic magnesium compound, which comprises at least six fluorine atoms per magnesium atom, is contacted with the substrate and is the resultant layer of the solution formed on the substrate treated thermally while forming magnesium fluoride by disproportionation.

2. A method as claimed in claim 1, characterized in that the fluorine-containing organic magnesium compound comprises at least two —CF3— groups per magnesium atom.

3. A method as claimed in claim 2, characterized in that the fluorine-containing organic magnesium compound is chosen from the group consisting of magnesium trifluoroacetate, magnesium trifluoroacetylacetonate and magensium hexafluoroacetylacetonate.

4. A method as claimed in claim 1, characterized in that a substrate is coated with a layer of a solution of the fluorine-containing organic magnesium compound in an organic solvent, after which the resulting layer is heated to a temperature of at least 300° C. for at least one minute.

5. A method as claimed in claim 4, characterized in that the fluorine-containing organic magnesium compound is magnesium trifluoroacetate.

6. A method as claimed in claim 1, characterized in that a solution of the fluorine-containing organic magnesium compound in an organic solvent is sprayed on a substrate which is maintained at a temperature between 400° and 750° C.

7. A method as claimed in claim 6, characterized in that the solution of the fluorine-containing organic magnesium compound is atomized ultrasonically using air as a carrier gas after which the solution is sprayed on the substrate.

8. A method as claimed in claim 6, characterized in that the organic solvent has a boiling point between 100° and 160° C.

9. A method as claimed in claim 6, characterized in that the fluorine-containing organic magnesium compound is magnesium hexafluoroacetylacetonate and is dissolved in ethyleneglycol monoethyl ether.

10. A method as claimed in claim 2, characterized in that a substrate is coated with a layer of a solution of the fluorine-containing organic magnesium compound in an organic solvent, after which the resulting layer is heated to a temperature of at least 300° C. for at least one minute.

11. A method as claimed in claim 3, characterized in that a substrate is coated with a layer of a solution of the fluorine-containing organic magnesium compound in an organic solvent, after which the resulting layer is heated to a temperature of at least 300° C. for at least one minute.

12. A method as claimed in claim 2, characterized in that a solution of the fluorine-containing organic magnesium compound in an organic solvent is sprayed on a substrate which is maintained at a temperature between 400° and 750° C.

13. A method as claimed in claim 3, characterized in that a solution of the fluorine-containing organic magnesium compound in an organic solvent is sprayed on a substrate which is maintained at a temperature between 400° and 750° C.

14. A method as claimed in claim 7, characterized in that the fluorine-containing organic magnesium compound is magnesium hexafluoroacetylacetonate and is dissolved in ethyleneglycol monoethyl ether.

15. A method as claimed in claim 8, characterized in that the fluorine-containing organic magnesium compound is magnesium hexafluoroacetylacetonate and is dissolved in ethyleneglycol monoethyl ether.

* * * * *